United States Patent [19]
Eisele et al.

[11] Patent Number: 5,330,846
[45] Date of Patent: Jul. 19, 1994

[54] HEAT-CURABLE, AQUEOUS SYNTHETIC RESIN MIXTURES FOR COATING WOODWORKING MATERIALS

[75] Inventors: Wolfgang Eisele, Ludwigshafen; Hans Etling, Dannstadt-Schauernheim; Walter Pfalzgraf, Mutterstadt; Walter Pitteroff, Bobenheim; Otto Wittmann, Frankenthal, all of Fed. Rep. of Germany

[73] Assignee: BASF Aktiengesellschaft, Ludwigshafen, Fed. Rep. of Germany

[21] Appl. No.: 759,658

[22] Filed: Sep. 13, 1991

Related U.S. Application Data

[63] Continuation of Ser. No. 429,506, Oct. 31, 1989, abandoned.

[30] Foreign Application Priority Data

Nov. 9, 1988 [DE] Fed. Rep. of Germany ....... 3837965

[51] Int. Cl.$^5$ .................. B32B 27/08; B32B 27/42; C08J 3/00; C08L 61/00
[52] U.S. Cl. ................... 428/503; 428/505; 428/530; 524/249; 524/512; 524/598
[58] Field of Search .................. 428/503, 530, 505; 524/512, 598, 249

[56] References Cited

U.S. PATENT DOCUMENTS

| | | | |
|---|---|---|---|
| 4,177,178 | 12/1979 | Das et al. | 524/512 |
| 4,264,656 | 8/1981 | Reeder | 524/249 |
| 4,413,100 | 11/1983 | Herbes | 525/398 |
| 4,473,613 | 9/1984 | Jaisle et al. | 428/530 |
| 4,536,245 | 8/1985 | Shiau et al. | 524/598 |
| 4,942,198 | 7/1990 | Dickerhof et al. | 524/510 |

FOREIGN PATENT DOCUMENTS

| | | | |
|---|---|---|---|
| 0106979 | 5/1984 | European Pat. Off. | |
| 4119533 | 9/1979 | Japan | 524/512 |
| 2207373 | 9/1987 | Japan | 524/512 |
| WO8705921 | 10/1987 | PCT Int'l Appl. | |
| 2200644 | 8/1988 | United Kingdom | 524/512 |

OTHER PUBLICATIONS

European Search Report.

*Primary Examiner*—Paul R. Michl
*Assistant Examiner*—P. Niland
*Attorney, Agent, or Firm*—Keil & Weinkauf

[57] ABSTRACT

Heat-curable, aqueous synthetic resin mixtures for coating woodworking materials, based on etherified melamine/formaldehyde condensates and aqueous synthetic resin dispersions, a process for the preparation of these mixtures and their use for coating woodworking materials.

6 Claims, No Drawings

HEAT-CURABLE, AQUEOUS SYNTHETIC RESIN MIXTURES FOR COATING WOODWORKING MATERIALS

This application is a continuation of application Ser. No. 07/429,506, filed on Oct. 31, 1989 now abandoned.

The present invention relates to heat-curable, aqueous synthetic resin mixtures for coating woodworking materials, based on etherified melamine/formaldehyde condensates and aqueous synthetic resin dispersions, and a process for the preparation of these mixtures and their use for coating woodworking materials.

For the production of plastic veneers, which are also referred to as finishing or edge foils, absorptive papers are impregnated with heat-curable aminoplast resin solutions, dried and cured in a stream of hot air and then coated with a lacquer. The heat-curable aminoplast resins generally used are urea/formaldehyde condensates, which may be modified with other components capable of aminoplast resin formation, for example melamine.

To ensure the required coating properties and to improve the handling of the foils, from 20 to 80 parts of polymer dispersion containing crosslinkable components are usually added to the aminoplast resin solution. However, such aminoplast resin mixtures have the disadvantage of high formaldehyde emission of more than 0.1 ppm of formaldehyde (compensating concentration in test room).

It is generally known that the level of formaldehyde emission in aminoplast resins can be reduced by adding urea or carrying out the condensation with a low molar ratio of formaldehyde to urea. However, if these measures are carried out in the case of the resin mixtures which are suitable for finishing foils, the moisture-resistance and water-resistance and the coating properties used for the surface treatment are reduced beyond the permitted tolerance limits, and the foils can no longer be employed for this field of use.

It is also generally known that the moisture-resistance and water-resistance of aminoplast resin products can be improved by using melamine in place of urea. However, mixtures prepared in this manner do not have a sufficiently long shelf life, as required for despatch from the manufacturer to the processor and for the necessary storage there.

German Laid-Open Application DOS 2,635,632 describes a heat-curable resin system based on a melamine/formaldehyde precondensate and a copolymer dispersion. In order to make the components of the system more compatible, a special comonomer of the formula I

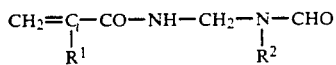

is required in the preparation of the copolymer. Although these systems have a pot life completely adequate for further processing, they do not have a long shelf life.

It is an object of the present invention to provide a heat-curable, aqueous synthetic resin mixture which is based on a melamine/formaldehyde precondensate and a copolymer dispersion and has a shelf life of several weeks as well as permitting the production of extremely low-formaldehyde plastics veneers without a deterioration in the remaining quality characteristics.

We have found that this object is achieved by using a melamine/formaldehyde condensate which has a molar ratio of melamine to formaldehyde of 1:4.5 to 1:5.8 and is virtually completely etherified.

The present invention relates to a heat-curable, aqueous synthetic resin mixture for coating woodworking materials, containing (A) from 5 to 50% by weight of an etherified melamine/formaldehyde condensate having a molar ratio of melamine to formaldehyde of from 1:4.5 to 1:5.8, (B) from 5 to 60% by weight of a copolymer which is present in the form of a dispersion, is crosslinkable by a condensation reaction and consists of predominant amounts of alkyl acrylates and/or methacrylates, minor amounts of comonomers having groups capable of crosslinking and other comonomers, and (C) from 10 to 50% by weight of urea, the amounts of components (A), (B) and (C) summing to 100% by weight and being based on the solids content of the aqueous synthetic resin mixture.

The novel synthetic resin mixtures have a long shelf life and also permit the production of extremely low-formaldehyde plastic veneers without a deterioration in the remaining quality characteristics. The low formaldehyde emission achievable is all the more surprising since the melamine/formaldehyde resin component to be used is prepared with a particularly high molar ratio of melamine to formaldehyde of 1:more than 4.

Regarding the components, the following may be stated specifically:

Components (A) used are melamine/formaldehyde condensates having a molar ratio of melamine to formaldehyde of 1:4.5 to 1:5.8, preferably from 1:5 to 1:5.5. They are etherified with $C_1$–$C_4$-alkanols, such as methanol, ethanol, propanol and/or butanol. Methanol and ethanol are preferred.

The preparation of component (A) is generally known. First, one mole of melamine is condensed with from 6 to 12 moles of formaldehyde at a pH of from 7 to 9 and at from 40° to 80° C., from 20 to 30 moles of methanol are added and etherification is carried out at a pH of from 1 to 5 and at from 40° to 80° C. The condensation conditions depend on the water dilutability desired for the resin, this dilutability being not less than 1:6. After the condensation, the melamine resins are freed from excess methanol and formaldehyde by distillation. Any residual formaldehyde present is converted when urea (C) is added, at from room temperature to 90° C., preferably from 60° to 70° C.

Component (A) is used in amounts of from 5 to 50, preferably from 20 to 40%, by weight. It is present as a 60–90% strength by weight aqueous solution.

Components (B) used are copolymer dispersions whose copolymers contain carboxyl, hydroxyl, amide, glycidyl, carbonyl, N-methylol, N-alkoxymethyl, amino and/or hydrazo groups. The abovementioned functional groups in the copolymer are obtained in a conventional manner by copolymerization of the corresponding monomers which carry these functional groups.

The copolymers contain the abovementioned functional groups in general in amounts such that they contain from 0.1 to 50, preferably from 0.3 to 15%, by weight, based on the copolymer, of these copolymerized monomers having functional groups.

Suitable comonomers for the monomers having the abovementioned functional groups are the conventional olefinically unsaturated monomers which are copolymerizable with the said monomers, for example $C_1$–$C_{12}$-alkyl esters of acrylic acid and methacrylic acid, preferably $C_1$–$C_8$-alkyl esters, e.g. methyl acrylate, methyl methacrylate, ethyl acrylate, ethyl methacrylate, propyl acrylate, propyl methacrylate, butyl acrylate, butyl methacrylate, 2-ethylhexyl acrylate, 2-ethylhexyl methacrylate, lauryl acrylate and lauryl methacrylate; vinyl esters of $C_2$–$C_4$-carboxylic acids, e.g. vinyl acetate and vinyl propionate, $C_1$–$C_4$-dialkyl esters of maleic acid and fumaric acid, vinylaromatics, such as styrene, α-methylstyrene and vinyltoluene; acrylonitrile, methacrylonitrile, and, in small amounts of not more than 5% by weight, based on the copolymer, acrylamide, methacrylamide and vinyl ethers of 3 to 10 carbon atoms, vinyl halides, such as vinyl chloride and vinylidene chloride; polyolefinically unsaturated compounds, such as butadiene and isoprene, and mixtures of the abovementioned monomers, provided that they are copolymerizable with one another. Preferred comonomers are acrylates, methacrylates, acrylonitrile, methacrylonitrile, vinyl chloride, vinylidene chloride, styrene and butadiene.

Component (B) is used in amounts of from 5 to 60, preferably from 20 to 50%, by weight. It is present as a 40-60% strength by weight aqueous dispersion.

Urea is used as component (C), in an amount of from 10 to 50, preferably from 20 to 40%, by weight. It can be used in solid form or as an aqueous solution.

For the preparation of the synthetic resin mixture, the components (A) and (C) are mixed with stirring at from room temperature to 90° C. left to cool to room temperature, mixed with component (B) and brought to a pH of from 7 to 9 by adding an inorganic or organic base.

However, it is also possible to mix all three components (A), (B) and (C) with stirring at from room temperature to 90° C. and to bring the mixture to a pH of from 7 to 9.

The resulting aqueous synthetic resin mixtures have a solids content of from 40 to 60, preferably from 45 to 55%, by weight. They are infinitely dilutable with water. Not more than 5% by weight of further modifiers and assistants, such as curing agents, further crosslinking agents or solvents, may also be added to the synthetic resin mixture.

When the synthetic resin mixture is used for the production of finishing foils, absorptive papers are impregnated in a known manner with a novel synthetic resin mixture, dried in a stream of hot air at from 140° to 200° C. and cured. These foils are then coated with conventional lacquers of type SH or DU. The ready produced foils are glued to woodworking materials, such as particle board substrates, at from room temperature to 180° C. and under from 2 to 15 N/cm². The formaldehyde emission of the surface is less than 0.5 mg per m² per h, according to the gas analysis method. The surfaces are transparent and highly glossy and have low water absorption combined with good mechanical properties.

EXAMPLES

Component (A): melamine/formaldehyde condensate 126 g (1 mole) of melamine were methylolated in the presence of 270 g (9 moles) of formaldehyde at a pH of 8.5 and at from 40° to 70° C. The resulting adduct was brought to a pH of 4 with formic acid and etherified at 60° C. with 900 g of methanol in the course of 15 minutes. After neutralization with sodium hydroxide solution, the reaction solution was freed from the unconverted formaldehyde and the excess methanol by evaporation (distillation).

Component (B): copolymer dispersion

A mixture of 450 g of n-butyl acrylate, 20 g of acrylic acid, 480 g of styrene and 30 g of acrylamide was polymerized in a known manner in the presence of 2% by weight of an anionic emulsifier and 0.5% by weight of an alkali metal peroxydisulfate to give a water-dilutable copolymer dispersion having a solids content of 50% by weight.

EXAMPLE 1

Synthetic resin mixture 1

20 g of the melamine/formaldehyde condensate mentioned under (A), 30 g of 68.2% strength by weight urea solution and 10.7 g of demineralised water were mixed with stirring at about 70° C., then cooled to room temperature and brought to a pH of from 8 to 9 by adding sodium hydroxide solution. 48 g of the copolymer dispersion (B) were then mixed with this solution. The synthetic resin mixture had a solids content of about 50% by weight and a viscosity of 9 mPa.s. It was infinitely dilutable with water and had a shelf life of more than 8 weeks at room temperature.

EXAMPLE 2

Synthetic resin mixture 2

30 g of the melamine/formaldehyde condensate mentioned under component A, 25 g of a 68.2% strength by weight urea solution and 28 g of demineralised water were stirred at about 70° C. and, after about 15 minutes, cooled to room temperature (25° C.). The resin solution thus obtained was mixed with 30 g of the copolymer dispersion B and the mixture was brought to a pH of 8.4 by adding 10% strength by weight sodium hydroxide solution. The resin mixture had a solids content of 53% by weight and a viscosity of 15 mPa.s; it was still infinitely dilutable with water, without coagulating, even after storage for 8 weeks at room temperature.

EXAMPLE 3

Use Example 18 and 20 g, respectively, of water, and 3.5 g of curing agent (34% strength by weight formic acid) were added to synthetic resin mixtures 1 and 2, and overlay papers having a weight of 80 g per m² were then impregnated with the said mixtures and dried so that the overlay papers had a solid resin coat of from 48 to 52% by weight. The impregnated papers were given a top coat (15 g/m²) of an SH-based texturing finish (a melamine/formaldehyde resin) and were glued to a commercial particle board of emission class E1 using an adhesive based on polyvinyl acetate (white glue). The formaldehyde emission (DIN 52,368, gas analysis) was determined for the materials coated in this manner. Furthermore, the water absorption after storage in water for one hour at 20° C. was determined for the plastics veneers.

EXAMPLE 4

Comparative Example

An impregnating liquor was mixed from 50 g of a commercial urea/formaldehyde resin having a urea/- formaldehyde molar ratio of 1:1.6 and 45 g of copolymer dispersion (B), and 0.8 g of a curing catalyst (ammonium chloride) was added to the said liquor. This impregnating liquor was used to impregnate overlay papers having a weight of 80 g/m² so that a solid resin coat of about 50% by weight resulted. After coating with the acid curable texturing finish (SH) mentioned in Example 3, this plastics veneer was glued with white glue to a particle board of emission class E1. The water absorption and the formaldehyde emission were also measured.

Results:

|  | Formaldehyde emission according to DIN 52,368 | Water absorption after storage in water for 1 h at 20° C. |
|---|---|---|
| Resin mixture 1 Example 1 | 0.21 mg of formaldehyde/m² · h | 8% |
| Resin mixture 2 Example 2 | 0.45 mg of formaldehyde/m² · h | 9% |
| Comparative Example Example 4 | 9 mg of formaldehyde/m² · h | 12% |

The novel synthetic resin mixtures according to Examples 1 and 2 had a long shelf life and could be processed even after 8 weeks without a reduction in the penetrating power to give surface-coating material which has a negligible formaldehyde emission rate yet is very water-resistant.

We claim:

1. A finishing foil which comprises an absorptive paper impregnated with an aqueous synthetic resin mixture containing (A) from 5 to 50% by weight of an etherified melamine/formaldehyde condensate having a molar ratio of melamine to formaldehyde of from 1:4.5 to 1:5.8, (B) from 5 to 60% by weight of a copolymer which is present in the form of an aqueous dispersion, is crosslinkable by a condensation reaction and consists of predominant amounts of alkyl acrylates and/or methacrylates, minor amounts of comonomers having groups capable of crosslinking and other components, and (C) from 10 to 50% by weight of urea, the amount of components (A), (B) and (C) summing to 100% by weight and being based on the solids content of the aqueous synthetic resin mixture.

2. A finishing foil as defined in claim 1, containing, as component (A), a melamine/formaldehyde condensate etherified with $C_1$-$C_4$-alkanols.

3. A finishing foil as defined in claim 1, containing, as component (A), a melamine/formaldehyde condensate etherified with methanol.

4. A finishing foil as defined in claim 1, containing, as component (A), a melamine/formaldehyde condensate having a molar ratio of melamine to formaldehyde of from 1:5 to 1:5.5.

5. A finishing foil as defined in claim 1, containing, as component (B), a copolymer dispersion whose copolymer contains carboxyl, hyrdroxyl, amide, glycidyl, carbonyl, N-methylol, N-alkoxymethyl, amino and/or hydrazo groups.

6. A finishing foil as defined in claim 1, containing from 20 to 40% by weight of component (A), from 20 to 50% by weight of component (B) and from 20 to 40% by weight of urea (C).

* * * * *